July 3, 1962   S. SCHRECK   3,041,952
COMBINATION CAMERA AND FILM DEVELOPER
Filed Nov. 2, 1959

Seymour Schreck   INVENTOR.

United States Patent Office 3,041,952
Patented July 3, 1962

3,041,952
COMBINATION CAMERA AND FILM DEVELOPER
Seymour Schreck, Huntington Station, N.Y., assignor to Specialties, Incorporated, Syosset, N.Y.
Filed Nov. 2, 1959, Ser. No. 850,263
10 Claims. (Cl. 95—14)

This invention relates generally to novel means for developing, developing and fixing, or otherwise processing motion picture film, and in particular relates to a combination motion picture camera and associated film processing means.

In the prior art it has been standard practice for motion picture film to be developed in a dark room after removal from the camera. There are many occasions however in which it would be highly desirable if the film could be developed on the spot without the delay of removing the film and sending it to a development laboratory or the like. For illustration, in horse racing, motion pictures are frequently made of the finish so that the winning horse can be clearly chosen. It is easy to see that an immediate on-the-spot development of such film would be of considerable importance to this sport. The same considerations apply to human races and to athletic competitions of wide variety. Likewise, in automobile races and boat races and in various other races a combination motion picture camera and film developing equipment will be of much benefit.

There are many other applications in military and commercial fields in which this combination motion picture camera will be useful. In recording news events for television, for instance, it is desirable to have the film developed very quickly. In photographing enemy territor in war it is most important to get the pictures back to headquarters as soon as possible and this can be done by rapid development of motion pictures by my device and process and then using the film to transmit a television reproduction of the film. In making motion pictures showing the operation of machines, and in many similar industrial and military activities my combination camera will be of excellent applicability as it has already proved to be in a number of instances.

An object is to provide a combination motion picture and film development camera in which the film can be rapidly developed or developed and fixed.

Another object is to provide an accessory device which may be readily attached to a still camera or motion picture camera for developing the exposed film. In this application the words "developing" and "processing" or derivations thereof will be used to indicate developing or complete development and fixing of the exposed film.

An additional object is to provide a motion picture camera which can be used alone or in combination with developing equipment.

Other objects will be evident in the following description.

Figure 1:
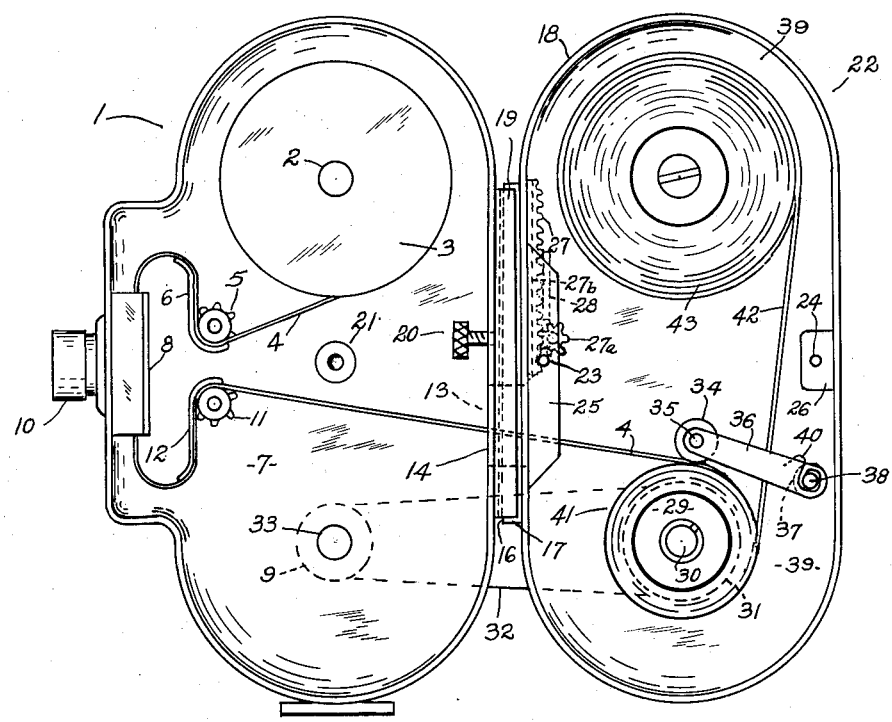
FIGURE 1 is a side elevation, with covers removed, of my combination motion picture camera and developing equipment.

In FIGURE 1, motion picture camera 1 may be of more or less standard construction, having stub shaft 2 on which film spool 3 may be rotatably mounted. Motion picture film 4 passes around sprocket 5 and adjacent to guide member 6 both of which are supported by the casing 7. The film is passed through feed compartment 8 in which the intermittent feed mechanism is actuated by a suitable spring placed on the opposite face of casing wall 7. The spring mechanism is suitably housed and it could be placed in the film compartment if dedesired. The pulley 9 on the outside of the casing is also driven by the spring or other motor for a purpose to be described.

The lens assembly 10 may be adjusted for proper focus or light exposure, or both, and is attached to the casing in usual manner. When the spring release (not shown) is pressed the spring or motor driven mechanism in compartment 8 feeds the film intermittently through it and the associated shutter means is automatically actuated to give the frames of the film the preset exposure during the short stationary intervals. The mechanism described is conventional and is found, with changes of detail, in many motion picture cameras. Accordingly it will not be described in detail.

Figure 2:
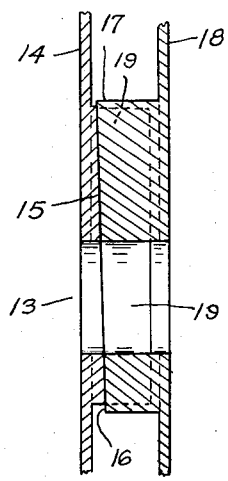
FIGURE 2 is a fragmentary sectional elevation of a window construction for permitting passage of exposed film from the camera to the development equipment.

After leaving the exposure and film feed compartment 8, the film is passed over sprocket 11 and adjacent to guide member 12, which member is supported on casing wall 7. The film is then passed through window 13 in the back wall 14 of the camera casing. Sprockets 5 and 11 are rotated by the camera mechanism in usual manner. This window may be provided as indicated in FIGURE 2. The rear wall 14 of the camera has aperture or window 13 and the wall may be thicker here and may have plane surface 15 inclined to the vertical as indicated. A similarly inclined plane surface 16 of wedge or cam member 17 extending from wall 18 is adapted to fit closely against surface 15 in light-tight manner. The surfaces may be painted a dull black.

Two spaced side bars 19 extend from the outside rear wall 14 and are flared to provide a locking track in which flared member 17 may be fitted. In view of the tapered construction of member 17 and the flared or keyway design of members 19, the surfaces 15 and 16 will be pressed tightly together when member 17 is pressed down into the track formed by members 19 and surface 15. If desired, locking screw 20 may be provided for locking the members tightly together. The apertures forming the window 13 are arranged so that they will be in register when surfaces 15 and 16 are pressed tightly together, the downward relative movement of member 17 being limited by the tapered construction.

The casing walls have curved portions and straight portions as shown. The cover of camera 1 may be attached by means of a screw threaded into post 21 extending from wall 7. Similarly, the cover for developer unit 22, having wall 18, may be attached by means of screws threaded into holes 23 and 24 in respective frame or casing member 25 and lug 26. These covers may be separate as described or one cover may be used for both units 1 and 22. It is usually preferable however to employ separate covers since the developer unit may be detached at any time and, furthermore, the developed film may be cut off and removed without exposing the remaining film on spool 3. In order to make this practical, rack 27, is guided by fixed member 28 and may be moved down by pinion 27a which may be rotated by the attached shaft having bearing in the casing and projecting therefrom. A button or knob may be attached to the projecting shaft in order to turn it. The rack moves attached shutter or plate 27b along with it until the window 13 is covered. The lower edge of plate 27b may be sharpened so that it will cut the film when moved through its full downward travel. The opaque plate 27b will therefore seal off light from entering the camera through window 13, and the exposed developed roll 41 can be removed at any time without exposing the film in the camera. Normally the pinion 27a is rotated clockwise until rack 27 and plate 27b are in their uppermost position, with window 13 open. A similar shutter or plate may be used in the camera if desired and it may be covered with soft rubber, velvet, or other material adapted to make a light-tight cover. These shutters may be hinged if desired.

Take-up roller or reel 29 is rotated by keyed shaft 30 having suitable bearings and carrying attached outside pulley 31, which is driven by belt 32 which passes over pulley 9. This pulley is driven by shaft 33 which is rotated by the camera mechanism when the shutter release is pressed. A shaft drive, in conjunction with suitable gears and slip connection, may be substituted for the belt and pulleys. The belt drives pulley 31 loosely, with enough torque to keep the film taut but the belt can slip on the pulley.

Roller 34 is rotatable about shaft 35 carried by arm 36 and a similar arm spaced from it; the arms and joining sleeve 37 being rotatable about shaft 38 fastened to wall 39 of the casing. Spring 40 is attached to shaft 38 and urges arm 36 counter clockwise about that shaft so that roller 34 is yieldingly pressed against film 4 which is wound into roll 41 in contact with developer strip 42. This strip comprises paper treated with a developer solution or a monobath including combined developer and fixative solutions. The absorbent web, which may be of paper, fabric, or the equivalent, carries the solution against the exposed film thereby developing it. This method or process developed by Specialties, Inc. of Skunks Misery Road, L.I., N.Y. has proved to be very effective in practice. The roll of chemically treated web is known as "Raproroll," a proprietary name owned by the above company.

The solution-impregnated Raprorolls may include various chemicals which have been found to be effective in processing silver halide or other film. Hydroquinone, for instance, is widely used in developer solutions and often in conjunction with other chemicals such as sodium sulphite, potassium bromide, sodium hydroxide, and the like. Sodium thiosulphate is frequently used as a fixative agent. Monobaths, comprising mixtures of developer and fixative solutions have also been used and in many cases I prefer to have web 42 treated with a monobath so that the images on film 4 will be developed and fixed when the web is brought into contact with the exposed film. This invention is not concerned with the chemical constituents of the Raproroll but with the method and means for using it.

In operation, the silver halide or other film 4 from spool 3 is threaded through drive sprocket 5, through exposure means 8, and through drive sprocket 11. The ends of film 4 and Raproroll web 42 are fastened to spool 29 by means of a slot in the spool or otherwise. The covers are fastened over the two casings and then motion pictures may be exposed on the film by pressing the shutter release. This causes sprockets 5 and 11 and the mechanism of device 8 to feed the film from spool 3 and pulley 9 is rotated in clockwise direction to cause belt 32 to rotate pulley 31 in the same direction at a rate sufficient to keep film 4 taut. At the same time the moist web or strip 42 from the Raproroll 43 is wound into roll 41, the film and web being wound together, with the emulsion covered surface of film 4 in contact with the web 42 having absorbed or otherwise-carried developer or developer-fixative solution. The result is that the rolled film is soon fully developed and can be removed from unit 22 after a relatively short period which, in practice, may vary from a fraction of a minute to a minute or more.

The roller 34 should preferably be moved along a radial line with respect to roll 41 and for that reason it is desirable to have arm 36 as long as practicable. The pivot 38 may be placed forward of web 42 in order to increase the length of the arm 36, thereby causing the travel of shaft 35 to approximate a radial line more closely. The pressure of roller 34 against roll 41 need not be excessive since there is a certain degree of packing or squeezing action as the film and web are wound into a roll. The pressure should be sufficient to help squeeze out air bubbles which may tend to collect between the web and film. In order to eliminate most of the bubbles the film and web can be brought together between two pressure rollers before the web and film are formed into roll 41.

Some solutions which may be used in Raproroll will turn dark if exposed to the atmosphere for appreciable periods. For that reason it is desirable to have the casings as air tight as possible. Sealing gaskets or the like may be used on the covers and around shafts. Furthermore, a pad of absorbent material containing the solution or solutions used in Raproroll may be placed in the casing 18 to react with the oxygen in order to reduce the undesirable effect on the Raproroll chemicals. Other chemicals designed to trap the oxygen or other harmful atmospheric components may likewise be used. The use of such a pad is optional however and is not essential.

In various patent applications assigned to Specialties, Inc. different types of Raproroll have been described. One of these systems contemplates a plurality of rolls of webbing. For instance one web may carry developer solution and another web may carry fixative solution and these may be applied to the exposed film in sequence. That double system can also be used in my combination camera-developer. Many other variations of detail will be readily apparent without departing from the principles of my invention. For illustration, the Raproroll web may be folded instead of being in a roll. Other changes may similarly be made.

What I claim is:

1. In a photographic device, motion picture camera means for exposing photographic film contained therein, said camera means having an opening in the casing thereof, another adjacent casing having an opening for matching the camera opening, means including a pair of diverging track elements attached to one said casing, means including a pair of diverging elements attached to the other said casing for engaging said track elements to lock said casings together, said openings being effectively in register when said casings are locked together, a roll of material having developer fluid absorbed therein and mounted in said other casing for rotation, a rotatable element mounted in said other casing for winding said film and material contiguously therearound, said film passing through said openings, and means connecting drive means of said motion picture camera with said element to cause rotation thereof.

2. The device as described in claim 1, and including a shutter for closing the opening in said other casing.

3. The device as described in claim 1, and including a movable shutter for closing the opening in said other casing, an edge of said shutter serving as a blade to cut said film.

4. The device as described in claim 1, and including a linearly movable shutter in said other casing for closing the opening therein, shutter guide means attached to said other casing, and means including gear means for moving said shutter into or out of register with said openings.

5. The device as described in claim 1, said connecting means being a slipping belt.

6. The device as described in claim 1, and including a pressure member and means resiliently pressing said member against said film in contact with said material.

7. In a photographic device, a casing for enclosing a roll of material having film developer fluid therein, a motion picture camera attached to said casing and having an opening in register with an opening in said casing for passage of film from said camera to the interior of said casing, a rotatable member in said casing to which member ends of said roll of material and film are attached, means in said casing for supporting said roll for unwinding said material therefrom, said camera having power means for moving said film, and means connecting said power means with said rotatable member to cause rotation thereof to wrap said film and material in contact into a roll for developing said film by means of said fluid.

8. The device as described in claim 7, and including yielding means pressing said film and material of said developing roll together in a direction generally toward the axis of rotation of said rotatable member.

9. The device as described in claim 7, and including a roller pressing said film against said material of said developing roll in a direction generally toward the axis of said rotatable member, and means including resilient means urging said roller in said direction.

10. The device as described in claim 7, said film being exposed simultaneously with the development of portions thereof by said developing roll.

References Cited in the file of this patent

UNITED STATES PATENTS

| | | |
|---|---|---|
| 1,207,042 | Hochstetter | Dec. 5, 1916 |
| 1,215,290 | London | Feb. 6, 1917 |
| 1,816,360 | Cawley | July 28, 1931 |
| 2,348,841 | Oswald | May 16, 1944 |
| 2,403,717 | Harvey | July 9, 1946 |
| 2,458,186 | Messina | Jan. 4, 1949 |
| 2,848,931 | Froidl | Aug. 26, 1958 |
| 2,906,399 | Lysle | Sept. 29, 1959 |
| 2,930,302 | Tuttle | Mar. 29, 1960 |

OTHER REFERENCES

"American Cinematographer," volume 39, August 1958, pages 494 and 514 cited.